US011749308B2

(12) United States Patent
Kato (10) Patent No.: US 11,749,308 B2
(45) Date of Patent: Sep. 5, 2023

(54) DISK DEVICE WITH RAMPS

(71) Applicants: KABUSHIKI KAISHA TOSHIBA, Tokyo (JP); TOSHIBA ELECTRONIC DEVICES & STORAGE CORPORATION, Tokyo (JP)

(72) Inventor: Yasuhiko Kato, Setagaya Tokyo (JP)

(73) Assignees: Kabushiki Kaisha Toshiba, Tokyo (JP); Toshiba Electronic Devices & Storage Corporation, Tokyo (JP)

( * ) Notice: Subject to any disclaimer, the term of this patent is extended or adjusted under 35 U.S.C. 154(b) by 0 days.

(21) Appl. No.: 17/683,742

(22) Filed: Mar. 1, 2022

(65) Prior Publication Data

US 2023/0088522 A1 Mar. 23, 2023

(30) Foreign Application Priority Data

Sep. 22, 2021 (JP) ................. 2021-154722

(51) Int. Cl.
  *G11B 21/12* (2006.01)
  *G11B 33/02* (2006.01)
  *G11B 5/48* (2006.01)
  *G11B 5/54* (2006.01)

(52) U.S. Cl.
  CPC ............ *G11B 21/12* (2013.01); *G11B 5/4813* (2013.01); *G11B 5/54* (2013.01); *G11B 33/022* (2013.01); *G11B 2220/21* (2013.01); *G11B 2220/2516* (2013.01)

(58) Field of Classification Search
  None
  See application file for complete search history.

(56) References Cited

U.S. PATENT DOCUMENTS

| | | | | |
|---|---|---|---|---|
| 5,341,260 A | * | 8/1994 | Jabbari | G11B 21/12 |
| 5,875,074 A | | 2/1999 | Ho et al. | |
| 6,134,076 A | | 10/2000 | Boutaghou et al. | |
| 6,226,154 B1 | * | 5/2001 | Albrecht | G11B 5/54 |
| 6,538,851 B1 | | 3/2003 | Sasaki | |
| 6,643,088 B1 | * | 11/2003 | Kawachi | G11B 21/12 |
| 6,693,773 B1 | * | 2/2004 | Sassine | G11B 5/54 |
| 10,910,005 B1 | * | 2/2021 | Teo | G11B 5/4826 |

* cited by examiner

*Primary Examiner* — William J Klimowicz
(74) *Attorney, Agent, or Firm* — Kim & Stewart LLP (57) ABSTRACT

A disk device includes magnetic disks, ramps, suspensions, and magnetic disks. The magnetic disks are arranged above a housing bottom and configured to be rotated around a first rotation axis. The ramps are arranged above the housing bottom. The suspensions are configured to be rotated around a second rotation axis parallel to the first rotation axis, The magnetic heads are mounted on the suspensions, respectively. Each of the suspensions is configured to be rotated around the second rotation axis from a first position above or below one of the magnetic disks to a second position on one of the ramps. The plurality of ramps includes a first ramp and a second ramp that is above the first ramp. An inner end of the second ramp is closer to the first rotation axis than is an inner end of the first ramp.

20 Claims, 6 Drawing Sheets

DISK DEVICE WITH RAMPS

CROSS-REFERENCE TO RELATED APPLICATION

This application is based upon and claims the benefit of priority from Japanese Patent Application No. 2021-154722, filed Sep. 22, 2021, the entire contents of which are incorporated herein by reference.

FIELD

Embodiments described herein relate generally to a disk device.

BACKGROUND

In a disk device such as a hard disk drive (HDD), a suspension of an actuator assembly that holds a magnetic head moves between a load position and an unload position. At the load position, the magnetic head is located on a surface of a magnetic disk and performs reading and writing with respect to the magnetic disk. At the unload position, the suspension is supported by a ramp and the magnetic head is separated from the magnetic disk.

Positions of assembled magnetic disks may differ from designed positions, for example, due to minor dimensional differences among the magnetic disks. Also, positions of the magnetic head and suspension at the load position are affected by the position of the corresponding magnetic disk. For these reasons, when the plurality of suspensions move toward the unload position, positions of the suspensions abutting the corresponding ramps may vary. Data areas of recording surfaces are set, for example, relative to a position where one of the suspensions first abuts the corresponding ramp. When the first abutment occurs too early, the data areas of the recording surfaces may be narrowed.

DETAILED DESCRIPTION

Embodiments provide a disk device capable of restricting a data area of a magnetic disk from narrowing.

In general, according to an embodiment, a disk device includes a plurality of magnetic disks, a plurality of ramps, a plurality of suspensions, and a plurality of magnetic heads. The plurality of magnetic disks are arranged above a housing bottom and configured to be rotated around a first rotation axis. The plurality of ramps are arranged above the housing bottom. The plurality of suspensions are configured to be rotated around a second rotation axis parallel to the first rotation axis, The plurality of magnetic heads are mounted on the suspensions, respectively, and configured to perform reading and writing with respect to the magnetic disks. Each of the suspensions is configured to be rotated around the second rotation axis from a first position above or below one of the magnetic disks to a second position on one of the ramps. The plurality of ramps includes a first ramp and a second ramp that is above the first ramp. An inner end of the second ramp is closer to the first rotation axis than is an inner end of the first ramp.

First Embodiment

Hereinafter, a first embodiment will be described with reference to FIGS. 1 to 4. In this specification, component elements according to the embodiments and a description of the elements may be described in a plurality of expressions. The component elements and their description are examples and are not limited by the expressions in this specification. The component elements may also be identified by names different from those in this specification. The component elements may also be described by expressions different from those in this specification.

Figure 1:
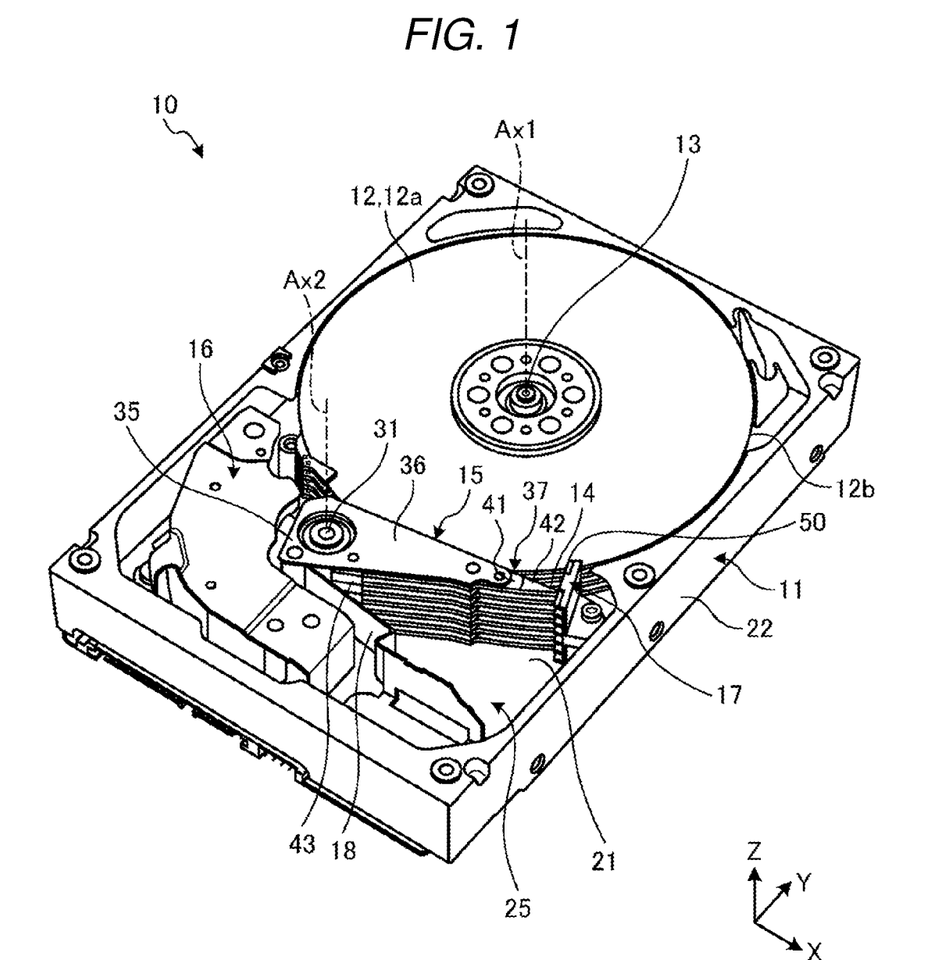
FIG. 1 illustrates a perspective view of a disk device according to a first embodiment.

FIG. 1 illustrates a perspective view of a hard disk drive (HDD) 10 according to the first embodiment. The HDD 10 is an example of a disk device and may also be referred to as an electronic device, a storage device, an external storage device, or a magnetic disk device.

As illustrated in each drawing, the X axis, Y axis, and Z axis are defined in this specification for convenience. The X axis, Y axis, and Z axis are orthogonal to each other. The X axis is along a width of the HDD 10. The Y axis is along a length of the HDD 10. The Z axis is along a thickness of the HDD 10.

Further, in this specification, an X direction, a Y direction, and a Z direction are defined. The X direction is a direction along the X axis and includes a +X direction indicated by the arrow on the X axis and a −X direction which is an opposite direction of the arrow on the X axis. The Y direction is a direction along the Y axis and includes a +Y direction indicated by the arrow on the Y axis and a −Y direction which is an opposite direction of the arrow on the Y axis. The Z direction is a direction along the Z axis and includes a +Z direction indicated by the arrow on the Z axis and a −Z direction which is an opposite direction of the arrow on the Z axis.

As illustrated in FIG. 1, the HDD 10 includes a housing 11, a plurality of magnetic disks 12, a spindle motor 13, a plurality of magnetic heads 14, an actuator assembly 15, a voice coil motor (VCM) 16, a ramp load mechanism 17, and a flexible printed wiring board (FPC) 18. The spindle motor 13 is an example of a motor. The magnetic head 14 may also be referred to as a slider. The ramp load mechanism 17 is an example of a ramp.

The housing 11 extends in the Y direction and is formed in a shape of a rectangular parallelepiped box open in the +Z direction. The housing 11 has a bottom wall 21 (may be referred to as a housing bottom) and a peripheral wall 22. The bottom wall 21 is an example of a wall. The housing 11 may further include other components such as a cover.

The bottom wall 21 is formed in a shape of a substantially rectangular (quadrangular) plate extending along an X-Y plane. The peripheral wall 22 protrudes in the substantially +Z direction from an edge of the bottom wall 21 and is formed in a substantially rectangular frame shape. The bottom wall 21 and the peripheral wall 22 are made of a metal material such as an aluminum alloy and are integrally formed.

In the housing 11, an inner chamber 25 opened in the +Z direction is provided. The inner chamber 25 is formed (defined, partitioned) by, for example, the bottom wall 21 and the peripheral wall 22. Therefore, the peripheral wall 22 surrounds the inner chamber 25. The magnetic disk 12, the spindle motor 13, the magnetic head 14, the actuator assembly 15, the VCM 16, and the ramp load mechanism 17 are accommodated in the inner chamber 25 of the housing 11.

The inner chamber 25 is substantially airtightly closed by, for example, the cover. The inner chamber 25 is filled with a gas different from air. For example, a low-density gas having a density lower than that of air, an inert gas having a low reactivity, or the like is filled in the inner chamber 25. In the present embodiment, helium is filled in the inner chamber 25. In addition, another fluid may be filled in the inner chamber 25. Further, the inner chamber 25 may be maintained at a vacuum, a low pressure close to a vacuum, or a negative pressure lower than the atmospheric pressure.

Each of a plurality of magnetic disks 12 is formed in a disk shape extending along an X-Y plane. A diameter of the magnetic disk 12 is, for example, 3.5 inches, but is not limited to this example. Each of the plurality of magnetic disks 12 has, for example, at least one recording surface 12a and an outer edge 12b.

The recording surface 12a is provided on at least one of an upper surface and a lower surface of the magnetic disk 12. In other words, each of the plurality of recording surfaces 12a is a surface of the magnetic disk 12 facing the substantially +Z direction or a surface of the magnetic disk 12 facing the substantially -Z direction. The recording surface 12a is a substantially flat surface extending along the X-Y plane. A magnetic recording layer of the magnetic disk 12 is provided on the recording surface 12a. The magnetic recording layer may not be provided on a part of the recording surface 12a. The outer edge 12b is an outer peripheral surface of the magnetic disk 12.

In the HDD 10 in the present embodiment, the number of magnetic disks 12 is, for example, ten or more. The number of magnetic disks 12 in the HDD 10 is not limited to this example, and may be less than ten.

The spindle motor 13 is attached to the bottom wall 21 of the housing 11. Alternatively, the spindle motor 13 may be located at another position. The plurality of magnetic disks 12 are attached to the spindle motor 13.

The plurality of magnetic disks 12 are arranged at intervals in the Z direction. For example, spacers are placed between the plurality of magnetic disks 12. The spindle motor 13 has a hub which supports the plurality of magnetic disks 12. The plurality of magnetic disks 12 are held in the hub of the spindle motor 13 by, for example, a clamp spring.

The spindle motor 13 rotates the plurality of magnetic disks 12 around a first rotation axis Ax1. The first rotation axis Ax1 is a virtual axis extending in the substantially Z direction. That is, the first rotation axis Ax1 extends in a direction orthogonal to (i.e., intersects) the recording surface 12a.

The first rotation axis Ax1 is a center of rotation by the spindle motor 13 and is also a center axis of the magnetic disk 12 and the hub of the spindle motor 13. A central axis of the disk-shaped magnetic disk 12 and a central axis of the hub of the spindle motor 13 may be different from a center of rotation by the spindle motor 13.

Each of the plurality of magnetic heads 14 records and reproduces information with respect to the recording surface 12a of the magnetic disk 12. In other words, the magnetic head 14 reads information from and writes information to the magnetic disk 12. The magnetic head 14 is mounted on the actuator assembly 15.

The actuator assembly 15 is rotatably supported by a support shaft 31 located at a position apart from the magnetic disk 12. The support shaft 31 extends, for example, in the substantially +Z direction from the bottom wall 21 of the housing 11.

The actuator assembly 15 can rotate around a second rotation axis Ax2, which is apart from the first rotation axis Ax1. The second rotation axis Ax2 is a virtual axis extending in the substantially Z direction. Therefore, the first rotation axis Ax1 and the second rotation axis Ax2 are located substantially in parallel. The second rotation axis Ax2 is, for example, a center of rotation of the actuator assembly 15 and also a center axis of the support shaft 31.

Axial, radial, and circumferential directions are defined in this specification. The axial direction is a direction along a virtual axis such as the first rotation axis Ax1 and the second rotation axis Ax2 and includes one direction and the other direction along the axis. The radial direction is a direction orthogonal to the axis and includes a plurality of directions orthogonal to the axis. The circumferential direction is a direction around the axis and includes a direction which rotates clockwise around the axis and a direction which rotates counterclockwise.

As described above, the first rotation axis Ax1 and the second rotation axis Ax2 extend substantially in parallel in the substantially Z direction and are apart from each other. That is, the axial direction of the first rotation axis Ax1 and the axial direction of the second rotation axis Ax2 are the Z direction. The Z direction may also be referred to as a seek direction. The first rotation axis Ax1 is apart from the second rotation axis Ax2 in the radial direction of the second rotation axis Ax2.

The VCM 16 rotates the actuator assembly 15 around the second rotation axis Ax2 and places the actuator assembly 15 in a desired position. When the magnetic heads 14 move to an outermost circumference of the magnetic disk 12 due to the rotation of the actuator assembly 15 by the VCM 16, the ramp load mechanism 17 holds the magnetic heads 14 at positions away from the magnetic disk 12.

The actuator assembly 15 includes an actuator block 35, a plurality of arms 36, and a plurality of head suspension assemblies (may be referred to as suspensions) 37. The suspension 37 may also be referred to as a head gimbal assembly (HGA).

The actuator block 35 is rotatably supported by the support shaft 31 via, for example, a bearing. The plurality of arms 36 protrude from the actuator block 35 in the radial direction of the second rotation axis Ax2. The actuator assembly 15 may include a plurality of actuator blocks and the arm 36 may protrude from each of the plurality of actuator blocks.

The plurality of arms 36 are disposed at intervals in the axial direction of the second rotation axis Ax2. Each of the arms 36 is formed in a plate shape which allows entry into a gap between adjacent two magnetic disks 12. The plurality of arms 36 extend substantially in parallel.

The actuator block 35 and the plurality of arms 36 are integrally formed and formed of, for example, aluminum. The materials of the actuator block 35 and the arm 36 are not limited to this example.

A voice coil of the VCM 16 is provided on a protrusion protruding from the actuator block 35 on an opposite side of the arm 36. The VCM 16 has a pair of yokes, a voice coil located between the yokes, and a magnet provided on the yoke.

As described above, the VCM 16 rotates the actuator assembly 15 around the second rotation axis Ax2. In other words, the VCM 16 integrally rotates (moves) the actuator block 35, the arm 36, and the suspension 37 around the second rotation axis Ax2.

The suspension 37 is attached to a tip portion of its corresponding arm 36 and extends from the arm 36. As a result, the plurality of suspensions 37 are disposed at intervals in the axial direction of the second rotation axis Ax2. Each of the plurality of suspensions 37 has a base plate 41, a load beam 42, and a flexure 43.

The base plate 41 and the load beam 42 are made of, for example, stainless steel. The materials of the base plate 41 and the load beam 42 are not limited to this example. The base plate 41 is formed in a plate shape and is attached to a tip portion of the arm 36. The load beam 42 is attached to a tip portion of the base plate 41 and protrudes from the base plate 41 in the radial direction of the second rotation axis Ax2.

The load beam 42 is thinner than the base plate 41 and is formed in a plate shape extending along an X-Y plane. That is, the load beam 42 is supported by the base plate 41, which is in a cantilever shape, and can be bent with one end attached to the base plate 41 as a pivot.

Figure 2:
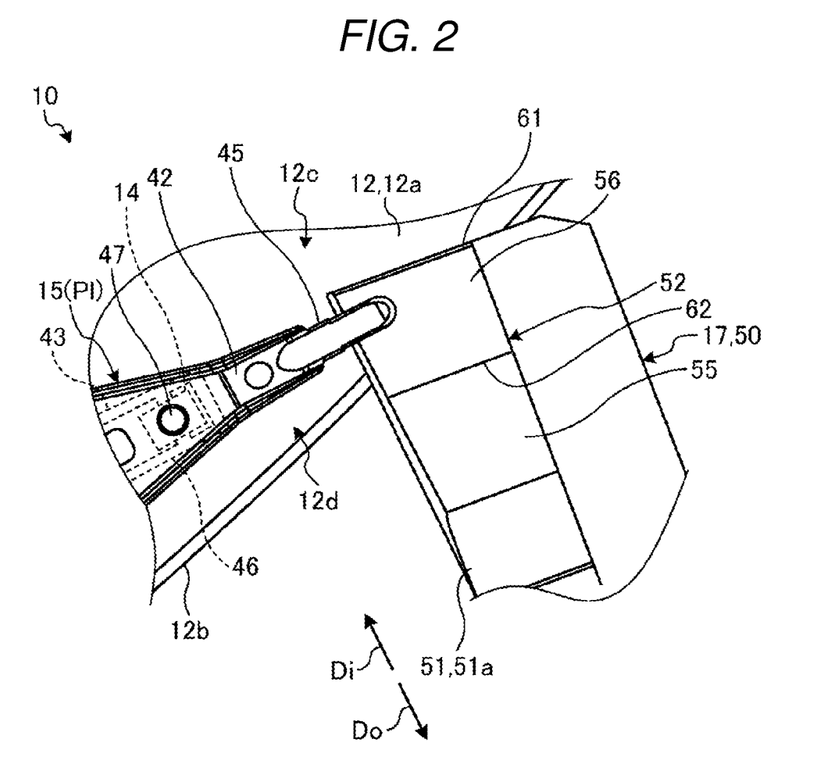
FIG. 2 illustrates a plan view of a part of the disk device according to the first embodiment.

FIG. 2 illustrates a plan view of a part of the HDD 10 according to the first embodiment. As illustrated in FIG. 2, the load beam 42 has a lift tab 45. The lift tab 45 is an example of a sliding portion. The lift tab 45 is located at a tip portion of the actuator assembly 15 in the radial direction of the second rotation axis Ax2. In other words, the lift tab 45 is separated from the second rotation axis Ax2 in the radial direction of the second rotation axis Ax2.

The lift tab 45 is bent into a substantially boat shape extending in the radial direction of the second rotation axis Ax2. Therefore, the lift tab 45 has a cross section which protrudes in a substantially arc shape toward the recording surface 12a of the corresponding magnetic disk 12. The shape of the lift tab 45 is not limited to this example.

The flexure 43 is formed in an elongated strip shape. The shape of the flexure 43 is not limited to this example. The flexure 43 is a stacked board having a metal plate (e.g., backing layer) made of, for example, stainless steel, an insulating layer formed on the metal plate, a conductive layer formed on the insulating layer and forming a plurality of wirings (wiring patterns), and a protective layer (insulating layer) covering the conductive layer.

The flexure 43 is attached to the base plate 41 and the load beam 42. One end of the flexure 43 has a gimbal portion (elastic support portion) 46 that is located above the load beam 42 and is displaceable. The gimbal portion 46 is an example of a holding portion.

The gimbal portion 46 is provided between the load beam 42 and the recording surface 12a of the magnetic disk 12 in the Z direction. The magnetic head 14 is mounted on the gimbal portion 46. In other words, the gimbal portion 46 holds the magnetic head 14. The flexure 43 is electrically connected to the magnetic head 14.

The gimbal portion 46 is swingably supported by, for example, a substantially hemispherical protrusion 47 provided on the load beam 42. Therefore, the magnetic head 14 can swing together with the gimbal portion 46.

The gimbal portion 46 is provided between the lift tab 45 and the second rotation axis Ax2 in the radial direction of the second rotation axis Ax2. Therefore, the magnetic head 14 is also located between the lift tab 45 and the second rotation axis Ax2 in the radial direction of the second rotation axis Ax2.

When the load beam 42 is bent so that the lift tab 45 is displaced in the Z direction, the gimbal portion 46 and the magnetic head 14 are also displaced in the Z direction. The displacement of the gimbal portion 46 and the magnetic head 14 does not have to completely follow the displacement of the lift tab 45. For example, the displacement of the gimbal portion 46 and the magnetic head 14 may occur later than the displacement of the lift tab 45. Further, for example, when the lift tab 45 is displaced in a predetermined range, the gimbal portion 46 and the magnetic head 14 may not be displaced.

One end of the FPC 18 in FIG. 1 is connected to the flexure 43. The other end of the FPC 18 is connected to a substrate (not shown) located outside the housing 11 via, for example, a connector (not shown) provided in the housing 11. For example, a controller which controls the entire HDD 10 and an interface connector connected to a host computer are mounted on the substrate. The substrate is electrically connected to the magnetic head 14 via the FPC 18 and the flexure 43.

The ramp load mechanism 17 is located at a position apart from the first rotation axis Ax1 in the radial direction of the first rotation axis Ax1. Further, the ramp load mechanism 17 is apart from the second rotation axis Ax2 in the radial direction of the second rotation axis Ax2.

Figure 3:
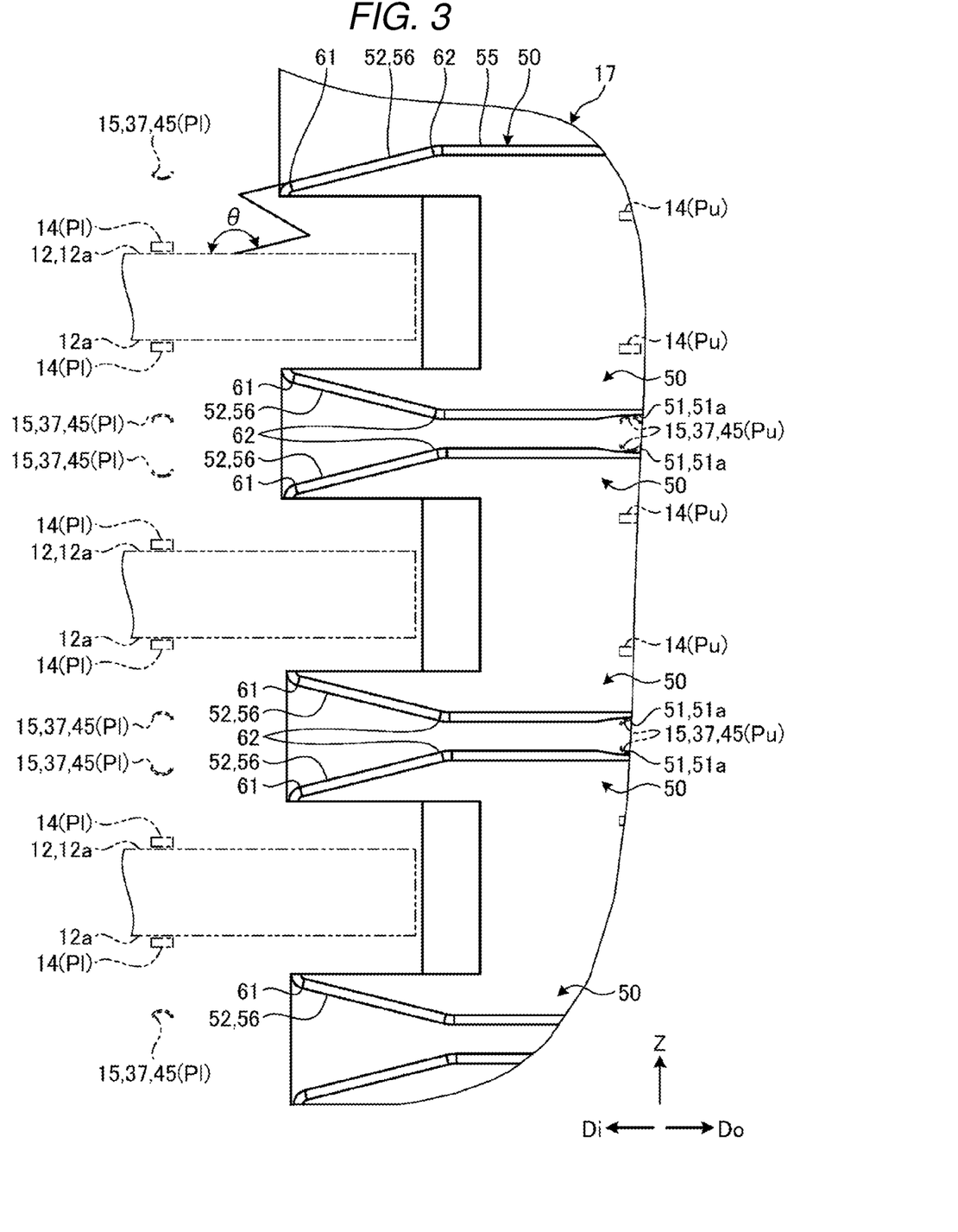
FIG. 3 illustrates a side view of a part of a ramp load mechanism in the disk device according to the first embodiment.

FIG. 3 illustrates a side view of a part of the ramp load mechanism 17 according to the first embodiment. FIGS. 3 to 6 schematically illustrate the ramp load mechanism 17 so that a left-right direction in the drawings is the circumferential direction around the second rotation axis Ax2.

As illustrated in FIG. 3, the ramp load mechanism 17 has a plurality of ramp units (may be referred to as ramps) 50. The plurality of ramp units 50 are provided corresponding to the plurality of magnetic heads 14, respectively. The plurality of magnetic heads 14 performs reading and writing with respect to the recording surfaces 12a of the magnetic disks 12. Therefore, the plurality of ramp units 50 are arranged at intervals in the Z direction. The corresponding magnetic disk 12 is located in a gap between adjacent two of ramp units 50.

For convenience, the following description mainly describes the recording surface 12a facing the +Z direction, the magnetic head 14, the actuator assembly 15, and the ramp unit 50 corresponding to the recording surface 12a. The description of the recording surface 12a facing the −Z direction, the magnetic head 14, the actuator assembly 15, and the ramp unit 50 correspond to the recording surface 12a may be obtained by exchanging the +Z direction and the −Z direction in the following description.

As illustrated in FIG. 2, the ramp unit 50 is located in a vicinity of the outer edge 12b of the magnetic disk 12. The ramp unit 50 covers a part of the recording surface 12a. The ramp unit 50 has a holding portion 51 and a guide portion 52.

The holding portion 51 can hold the lift tab 45 at a position apart from the outer edge 12b in the radial direction of the first rotation axis Ax1. The holding portion 51 may hold the lift tab 45 at the outer edge 12b in the radial direction of the first rotation axis Ax1.

For example, the holding portion 51 includes a recess portion 51a recessed in the −Z direction. When the lift tab 45 fits into the recess portion 51a, the ramp unit 50 holds the lift tab 45 and limits the rotation of the actuator assembly 15. The holding portion 51 may hold the lift tab 45 in other manners.

The lift tab 45 is held in the holding portion 51 of the ramp unit 50 as described above when the magnetic head 14 does not read information from or write information to the magnetic disk 12 (i.e., at the time of unloading). In other words, at the time of unloading, the lift tab 45 is located at a position apart in the radial direction of the first rotation axis Ax1 from the outer edge 12b of the magnetic disk 12. The lift tab 45 at the time of unloading may be located inside the outer edge 12b in the radial direction of the first rotation axis Ax1. In other words, the lift tab 45 at the time of unloading may overlap the recording surface 12a in the axial direction (Z direction) of the first rotation axis Ax1.

On the other hand, the lift tab 45 is basically located on the recording surface 12a of the magnetic disk 12 together with the magnetic head 14 when the magnetic head 14 reads information from and writes information to the magnetic disk 12 (i.e., at the time of loading). In other words, at the time of loading, the recording surface 12a faces the lift tab 45 via an interval. At the time of loading, at least a part of the lift tab 45 may be located at a position apart from the recording surface 12a in the radial direction of the first rotation axis Ax1.

The lift tab 45 moves between an area above the recording surface 12a and a position (home position) at which the lift tab 45 is held in the holding portion 51 in accordance with the rotation of the actuator assembly 15. When the lift tab 45 is held in the holding portion 51, the magnetic head 14 is apart from the recording surface 12a of the magnetic disk 12 in the Z direction and the radial direction of the first rotation axis Ax1. When the lift tab 45 is held in the holding portion 51, the magnetic head 14 may overlap the recording surface 12a in the Z direction.

The lift tab 45 moves (rotates) around the second rotation axis Ax1 in accordance with the rotation of the actuator assembly 15. In the present embodiment, a moving direction of the lift tab 45 is approximately along the radial direction of the first rotation axis Ax1. Therefore, the lift tab 45 can move approximately in the radial direction of the first rotation axis Ax1 in accordance with pivoting of the actuator assembly 15.

Specifically, the lift tab 45 can move between the vicinity of the first rotation axis Ax1 and the holding portion 51 in the circumferential direction (the radial direction of the first rotation axis Ax1) around the second rotation axis Ax2. That is, the lift tab 45 can move in the circumferential direction around the second rotation axis Ax2 in a direction toward the first rotation axis Ax1 and away from the holding portion 51 and in a direction away from the first rotation axis Ax1 and toward the holding portion 51.

As illustrated in FIG. 3, the actuator assembly 15 and the suspension 37 provided in the actuator assembly 15 rotate around the second rotation axis Ax2 between a load position P1 and an unload position Pu. The load position P1 and the unload position Pu are positions around the second rotation axis A2 to which the actuator assembly 15 can move.

At the time of loading, the actuator assembly 15 is located at the loading position P1. That is, when the actuator assembly 15 is located at the load position P1, the magnetic head 14 is located on the recording surface 12a of the magnetic disk 12.

In the following description, a position of the magnetic head 14 around the second rotation axis Ax2 when the actuator assembly 15 is located at the load position P1 may also be referred to as the load position P1. Further, the load position P1 is not limited to one position and includes a plurality of positions where the magnetic head 14 is located on the recording surface 12a.

On the other hand, at the time of unloading, the actuator assembly 15 is located at the unload position Pu. That is, when the actuator assembly 15 is located at the unload position Pu, the lift tab 45 is supported by the holding portion 51 of the ramp load mechanism 17 so that the magnetic head 14 is further separated from the recording surface 12a. In the following description, a position of the magnetic head 14 around the second rotation axis Ax2 when the actuator assembly 15 is located at the unload position Pu may also be referred to as the unload position Pu.

The magnetic head 14 at the unload position Pu is apart from the recording surface 12a in the Z direction. There may also be a gap between the magnetic head 14 and the recording surface 12a at the load position P1. However, in the Z direction, the magnetic head 14 at the unload position Pu is more distant from the recording surface 12a than is the magnetic head 14 at the load position P1.

The guide portion 52 is located between the load position P1 and the unload position Pu in the circumferential direction around the second rotation axis Ax2. In other words, the guide portion 52 is located between the first rotation axis Ax1 and the holding portion 51 in the radial direction of the first rotation axis Ax1.

The guide portion 52 leads to the holding portion 51. The guide portion 52 has a flat surface 55 and an inclined surface 56. Since the ramp load mechanism 17 includes a plurality of guide portions 52 arranged in the Z direction, the ramp load mechanism 17 includes a plurality of flat surfaces 55 and a plurality of inclined surfaces 56.

The flat surface 55 is a flat surface substantially parallel to the recording surface 12a of the magnetic disk 12. That is, the flat surface 55 expands along the X-Y plane and faces the +Z direction. The recess portion 51a of the holding portion 51 is recessed in the −Z direction from the flat surface 55.

In the direction along the recording surface 12a, the flat surface 55 is located at a position apart from the recording surface 12a in the circumferential direction (the radial direction of the first rotation axis Ax1) around the second rotation axis Ax2. The position of the flat surface 55 is not limited to this example. Further, the flat surface 55 is separated from the recording surface 12a in the +Z direction.

The inclined surface 56 is located between the first rotation axis Ax1 and the flat surface 55 in the circumferential direction around the second rotation axis Ax2 (and also in the radial direction of the first rotation axis Ax1). The inclined surface 56 leads to the flat surface 55.

The inclined surface 56 extends at an obtuse angle with respect to its corresponding recording surface 12a so that the farther the inclined surface 56 is from the first rotation axis Ax1 in the circumferential direction around the second rotation axis Ax1, the farther the inclined surface 56 is from its corresponding recording surface 12a in the Z direction. That is, an angle θ between the inclined surface 56 and its corresponding recording surface 12a is greater than 90° and less than 180°.

The inclined surface 56 is, for example, a flat surface extending substantially linearly. The inclined surface 56 is not limited to this example and may be, for example, a curved surface. Also, the angle θ between the inclined surface 56 and its corresponding recording surface 12a may vary.

In the present embodiment, the angles θ between the plurality of inclined surfaces 56 and its corresponding recording surfaces 12a are equal to each other. Even when there is a slight amount of non-uniformity in the angles θ between the plurality of inclined surfaces 56 and their corresponding recording surfaces 12a due to deformation, dimensional tolerance, or other factors, the plurality of angles θ can be treated as being equal to each other. In other embodiments, the angles θ between the plurality of inclined surfaces 56 and their corresponding recording surfaces 12a may be substantially different from each other.

As illustrated in each drawing, the circumferential direction around the second rotation axis Ax2 includes an inward direction Di and an outward direction Do. The inward direction Di is a direction toward the first rotation axis Ax1 around the second rotation axis Ax2. The outward direction Do is an opposite direction of the inward direction Di.

As illustrated in FIG. 2, in the direction along the recording surface 12a, the inclined surface 56 extends in the circumferential direction around the second rotation axis Ax2. An end (may be referred to as an inner end) 61 of the inclined surface 56 in the inward direction Di faces the first rotation axis Ax1 in the circumferential direction around the second rotation axis Ax2. An end 62 (may be referred to as an outer end) of the inclined surface 56 in the outward direction Do leads to the flat surface 55.

When the actuator assembly 15 moves from the load position P1 to the unload position Pu, the lift tab 45 abuts the inclined surface 56. When the actuator assembly 15 moves further toward the unload position Pu, the lift tab 45 moves while being supported by the inclined surface 56, and thus the lift tab 45 gradually moves apart from the recording surface 12a in the Z direction. That is, the inclined surface 56 supports the lift tab 45 of the suspension 37 when the corresponding suspension 37 moves from the load position P1 to the unload position Pu.

In the following description, movement of the magnetic head 14 and the lift tab 45 while the actuator assembly 15 moves from the load position P1 to the unload position Pu will be described in detail. As illustrated in FIG. 2, when the actuator assembly 15 is located at the load position P1, the magnetic head 14 is located on the recording surface 12a.

The recording surface 12a has a data area 12c and an invalid area 12d. The data area 12c is an area of the recording surface 12a in which information can be read and written by the magnetic head 14. When the actuator assembly 15 is located at the load position P1, the magnetic head 14 is located on the data area 12c. The invalid area 12d is provided between the data area 12c and the outer edge 12b of the recording surface 12a. The invalid area 12d is, for example, an area in which information is not read or written by the magnetic head 14.

As illustrated in FIG. 3, when the actuator assembly 15 is located at the load position P1, the magnetic head 14 floats on the recording surface 12a by airflow generated between the rotating magnetic disk 12 and the magnetic head 14. That is, the magnetic head 14 at the load position P1 is slightly separated from the recording surface 12a in the Z direction.

The airflow generates a force (positive pressure) that works to separate the magnetic head 14 from the recording surface 12a and a force (negative pressure) that attracts the magnetic head 14 closer to the recording surface 12a. The airflow keeps the magnetic head 14 away from the recording surface 12a at a position (may be referred to as a balanced position) where the positive pressure and the negative pressure are balanced. That is, the airflow restricts the magnetic head 14 from approaching the recording surface 12a and the magnetic head 14 from moving apart from the recording surface 12a.

The magnetic head 14 urges the suspension 37 toward the magnetic head 14 when the magnetic head 14 is in the balanced position. Therefore, the distance between the suspension 37 including the lift tab 45 and the recording surface 12a is also kept substantially constant. The magnetic head 14 and the suspension 37 at the load position P1 are not limited to this example.

At the load position P1, the lift tab 45 is apart from the ramp unit 50. In the Z direction, the lift tab 45 is apart by a predetermined interval from the magnetic head 14. The distance between the lift tab 45 and the magnetic head 14 may vary depending on, for example, vibration of the load beam 42. When the actuator assembly 15 rotates from the load position P1 to the unload position Pu, the lift tab 45 abuts the inclined surface 56.

When the actuator assembly 15 further rotates toward the unload position Pu, the lift tab 45 moves while being supported by the inclined surface 56. While the actuator assembly 15 rotates, the lift tab 45 gradually moves apart from the recording surface 12a of the magnetic disk 12. Depending on the displacement of the lift tab 45, the load beam 42 and the gimbal portion 46 urge the magnetic head 14 in the +Z direction. However, the magnetic head 14 is kept in the balanced in the Z direction by the airflow between the magnetic head 14 and the recording surface 12a.

As the actuator assembly 15 rotates further, the lift tab 45 further moves apart from the recording surface 12a. As a result, the force with which the load beam 42 and the gimbal portion 46 urge the magnetic head 14 exceeds the force with which the airflow between the magnetic head 14 and the recording surface 12a keeps the magnetic head 14 in the balanced position. In this case, the magnetic head 14 can be separated from the recording surface 12a of the magnetic disk 12 in the Z direction.

The lift tab 45 gradually moves apart from the recording surface 12a while moving toward the unload position Pu, supported by the inclined surface 56. Depending on the displacement of the lift tab 45, the load beam 42 and the gimbal portion 46 separate (peel off) the magnetic head 14 from the recording surface 12a. In other words, in the Z direction, the magnetic head 14 is more distant from the recording surface 12a than is the magnetic head 14 at the load position P1. As the actuator assembly 15 approaches the unload position Pu, the distance between the magnetic head 14 and the recording surface 12a becomes longer.

As the actuator assembly 15 rotates further, the lift tab 45 passes the inclined surface 56 and then moves to the flat surface 55. When the actuator assembly 15 reaches the unload position Pu, the lift tab 45 fits into the recess portion 51a of the holding portion 51 and is held in the holding portion 51. That is, when the suspension 37 is located at the unload position Pu, the recess portion 51a holds the lift tab 45.

A length of the inclined surface 56 in the Z direction and a length of the inclined surface 56 in the circumferential direction of the second rotation axis Ax1 are set in consideration of, for example, a distance (margin) between the load position P1 and the unload position Pu in the Z direction and a shaking amplitude of the magnetic disk 12 due to impact. The length of the inclined surface 56 is not limited to this example.

In the present embodiment, in the plurality of inclined surfaces 56, the farther the inclined surface 56 is from the bottom wall 21 in the Z direction, the closer the end 61 of that inclined surface 56 is to the first rotation axis Ax1. Therefore, in the circumferential direction around the second rotation axis Ax2, each end 61 of the plurality of inclined surfaces 56 is provided at the same position as or a position closer to the first rotation axis Ax1 than the end 61 of another inclined surface 56 that is adjacent to the inclined surface 56 and is closer to the bottom wall 21.

The ends 61 of two adjacent inclined surfaces of the plurality of inclined surfaces 56 may be provided at the same position in the circumferential direction around the second rotation axis Ax2. However, in the present embodiment, the end 61 of the inclined surface 56 among the plurality of inclined surfaces 56 which is the farthest from the bottom wall 21 is closer to the first rotation axis Ax1 than is another end 61 of the inclined surface 56 which is the closest to the bottom wall 21, in the circumferential direction around the second rotation axis Ax2.

Figure 4:
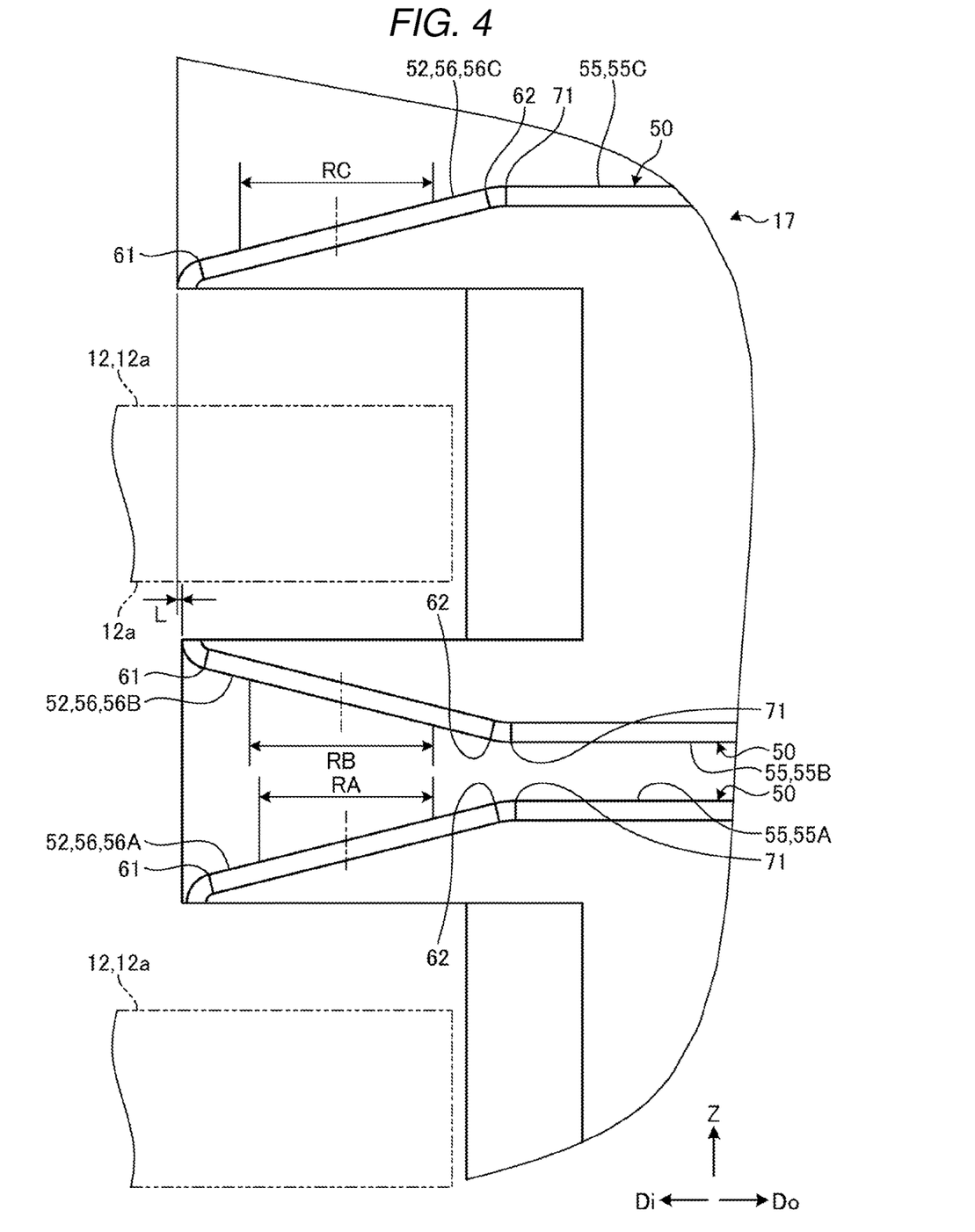
FIG. 4 illustrates a side view of three inclined surfaces of the ramp load mechanism in the disk device according to the first embodiment.

FIG. 4 illustrates a side view of inclined surfaces 56A, 56B, and 56C of the ramp load mechanism 17 in the first embodiment. The following description describes in detail the plurality of inclined surfaces 56 by taking FIG. 4 as an example.

As illustrated in FIG. 4, the plurality of inclined surfaces 56 include the inclined surfaces 56A, 56B, and 56C. The inclined surface 56A is an example of a first inclined surface. The inclined surface 56B is an example of a second inclined surface. The inclined surface 56C is an example of a third inclined surface.

The inclined surfaces 56A, 56B, and 56C are inclined surfaces of the plurality of inclined surfaces 56, which are different from each other. The three inclined surfaces 56A, 56B, and 56C support three lift tabs 45 of three suspensions of the plurality of suspensions 37. That is, the suspension 37 supported by the inclined surface 56A is different from the suspension 37 supported by the inclined surface 56B and different from the suspension 37 supported by the inclined surface 56C.

The inclined surface 56B is located between the inclined surface 56A and the inclined surface 56C in the Z direction. The inclined surface 56B is farther from the bottom wall 21 in the Z direction than is the inclined surface 56A. Further, the inclined surface 56B is closer to the bottom wall 21 in the Z direction than is the inclined surface 56C.

The inclined surface 56B is adjacent to the inclined surfaces 56A and 56C in the Z direction. The inclined surfaces 56A, 56B, and 56C are not limited to this example. For example, at least one of the plurality of inclined surfaces 56 may be located between the inclined surface 56A and the inclined surface 56B. Further, at least one of the plurality of inclined surfaces 56 may be located between the inclined surface 56B and the inclined surface 56C.

In the present embodiment, the end 61 of the inclined surface 56B is closer to the first rotation axis Ax1 than is the end 61 of the inclined surface 56A. In other words, in the circumferential direction around the second rotation axis Ax2, the end 61 of the inclined surface 56B is apart from the end 61 of the inclined surface 56A in the inward direction Di.

The end 61 of the inclined surface 56B is farther from the first rotation axis Ax1 than is the end 61 of the inclined surface 56C. In other words, the end 61 of the inclined surface 56B is apart from the end 61 of the inclined surface 56C in the outward direction Do in the circumferential direction around the second rotation axis Ax2.

A distance L between the ends 61 of two adjacent inclined surfaces 56 in the circumferential direction around the second rotation axis Ax2 is substantially constant. Alternatively, the ends 61 of the plurality of inclined surfaces 56 may be located so that the distance L changes.

The lengths of the plurality of inclined surfaces 56 are substantially constant in the circumferential direction around the second rotation axis Ax2. Therefore, the end 62 of the inclined surface 56B is closer to the first rotation axis Ax1 than is the end 62 of the inclined surface 56A. Also, the end 62 of the inclined surface 56B is farther from the first rotation axis Ax1 than is the end 62 of the inclined surface 56C. The lengths of the plurality of inclined surfaces 56 may be different from each other.

The plurality of flat surfaces 55 include flat surfaces 55A, 55B, and 55C. The flat surface 55A leads to the inclined surface 56A. The flat surface 55B leads to the inclined surface 56B. The flat surface 55C leads to the inclined surface 56C. Therefore, the flat surfaces 55A, 55B, and 55C support the lift tabs 45 of three of the plurality of suspensions 37, respectively. The flat surface 55B is farther from the bottom wall 21 in the axial direction of the first rotation axis Ax1 than is the flat surface 55A and closer to the bottom wall 21 in the axial direction of the first rotation axis Ax1 than is the flat surface 55C.

An end 71 of the flat surface 55 in the inward direction Di leads to the end 62 of the inclined surface 56 in the outward direction Do. Therefore, the end 71 of the flat surface 55B is closer to the first rotation axis Ax1 than is the end 71 of the flat surface 55A. Further, the end 71 of the flat surface 55B is farther from the first rotation axis Ax1 than is the end 71 of the flat surface 55C.

As illustrated in FIG. 3, the lift tabs 54 of the plurality of suspensions 37 overlap in the Z direction. In other words, the lift tabs 54 of the plurality of suspensions 37 are located at substantially the same position in the circumferential direction around the second rotation axis Ax1. Therefore, by design, when the plurality of suspensions 37 rotate from the load position P1 to the unload position Pu, the inclined surface 56B abuts the lift tab 45 before the inclined surface 56A abuts the lift tab 45 and after the inclined surface 56C abuts the lift tab 45.

The suspension 37 is urged toward the magnetic head 14 which is kept in the balanced position by the airflow. That is, when the suspension 37 is located at the load position P1, the position of the lift tab 45 in the Z direction is affected by the position of the recording surface 12a of the magnetic disk 12.

The thickness of the plurality of magnetic disks 12 and the spacers provided between the plurality of magnetic disks 12 in the Z direction may vary due to, for example, dimensional errors among the magnetic disks 12. Due to the variation in the thickness, the position of the lift tab 45 of the load position P1 in the Z direction also varies. Therefore, in the circumferential direction around the second rotation axis Ax1, the positions where the lift tabs 45 of the plurality of suspensions 37 abut the inclined surfaces 56 may also vary.

The plurality of magnetic disks 12 are stacked on the bottom wall 21 to which the spindle motor 13 is attached. Therefore, the farther the magnetic disk 12 is from the bottom wall 21, the more dimensional errors are accumulated, and thus the more likely the magnetic disk 12 deviates from a design position.

For example, due to the above factors, in the lift tabs 45 of the plurality of suspensions 37 at the load position P1, the farther the lift tab is from the bottom wall 21 in the Z direction, the greater the variation in the position of the lift tab in the Z direction. Therefore, in the lift tabs 45 of the plurality of suspensions 37, the farther the lift tab is from the bottom wall 21 in the Z direction, the greater the variation in the position of the lift tab where the lift tab abuts the inclined surface 56 in the circumferential direction around the second rotation axis Ax2.

As illustrated in FIG. 4, a range RB of a position where the lift tab 45 may abut the inclined surface 56B is longer than a range RA of a position where the lift tab 45 may abut the inclined surface 56A. Also, the range RB is shorter than a range RC of a position where the lift tab 45 may abut the inclined surface 56C.

For example, when assuming that the ends 61 of the inclined surfaces 56A, 56B, and 56C were in the same position in the circumferential direction around the second rotation axis Ax2, centers of the ranges RA, RB, and RC would be located in the same position. However, in contrast, in the HDD 10 according to the present embodiment, the center of the range RA is farther from the first rotation axis Ax1 than is the center of the range RB. Also, the center of the range RB is farther from the first rotation axis Ax1 than is the center of the range RC. The centers of the ranges RA, RB, and RC are, by design, positions where the lift tabs 45 abut the inclined surfaces 56.

Ends of the ranges RA, RB, and RC in the outward direction Do are located at substantially the same position in the circumferential direction around the second rotation axis Ax2. The ends of the ranges RA, RB, and RC in the outward direction Do are positions farthest from the first rotation axis Ax1 among positions where the lift tabs 45 may abut the inclined surfaces 56.

In the circumferential direction around the second rotation axis Ax2, the end of the range RB in the inward direction Di is apart from the end of the range RA in the inward direction Di toward the inward direction Di. Further, in the circumferential direction around the second rotation axis Ax2, the end of the range RB in the inward direction Di is apart from the end of the range RC in the inward direction Di to the outward direction Do.

The range RA overlaps with the ranges RB and RC. On the other hand, the range RB overlaps with the range RC, but does not overlap with the range RA in a vicinity of the end of the range RB in the inward direction Di. Further, the range RC does not overlap with the ranges RA and RB in a vicinity of the end of the range RC in the inward direction Di.

In the HDD 10, the data area 12c is set as follows, for example. First, among the lift tabs 45 of the plurality of suspensions 37, a lift tab 45 which first abuts the inclined surface 56 is identified. A boundary between the data area 12c and the invalid area 12d is set at a position apart from the position where the abutting lift tab 45 abuts the inclined surface 56 by a predetermined distance (angle) in the inward direction Di. The predetermined distance is referred to as an OD margin.

The area inside the boundary is set as the data area 12c. The data area 12c includes a servo area. Further, the area outside the boundary is set as the invalid area 12d. The invalid area 12d includes the OD margin and a so-called area loss.

As described above, the size of the data area 12c is set based on the position (may be referred to as a first touch position) where one of the lift tabs 45 of the plurality of suspensions 37 first abuts the inclined surfaces 56. Therefore, the closer the first touch position is to the first rotation axis Ax1, the narrower the data area 12c is.

To address this issue, according to the present embodiment, the positions of ends 61 of the inclined surfaces 56A, 56B, and 56C and the ranges RA, RB, and RC are set as described above. The first abutment between one of the lift tabs 45 and its corresponding inclined surface 56 is more likely to occur in a range where the ranges RA, RB, and RC overlap. That is, in a part of the range RA where it does not overlap with the ranges RB and RC, the first abutment between one of the lift tabs 45 and its corresponding inclined surface 56 is relatively unlikely to occur. Therefore, in the present embodiment, the first touch position tends to be farther from the first rotation axis Ax1, and thus the data area 12c tends to become wider.

The setting of the data area 12c is not limited to the above example. For example, the data area 12c may be set based on the position where one of the plurality of suspensions 37 first cause its corresponding magnetic head 14 to be separated.

The position where the suspension 37 causes the magnetic head 14 to be separated may vary similarly to the position where the lift tab 45 abuts the inclined surface 56. The range of a position where the suspension 37 may cause the magnetic head 14 to be separated approximately corresponds to the range of a position where the lift tab 45 may abut the inclined surface 56, with a shift of a predetermined distance toward the outward direction Do. For that reason, in the present embodiment, the position where the suspension 37 causes the magnetic head 14 to be separated tends to be farther from the first rotation axis Ax1, and thus the data area 12c tends to become wider.

In the HDD 10 according to the first embodiment described above, the ramp load mechanism 17 includes the plurality of inclined surfaces 56. Each inclined surface 56 extends obliquely at an obtuse angle with respect to its corresponding recording surface 12a so that the farther the inclined surface 56 is from the first rotation axis Ax1 in the circumferential direction around the second rotation axis Ax1, the farther the inclined surface 56 is from its corresponding recording surface 12a in the Z direction. The inclined surface 56 supports sits corresponding lift tab 45 when its corresponding suspension 37 rotates from the load position P1 to the unload position Pu. The plurality of magnetic disks 12 are arranged in the Z direction and rotated by the spindle motor 13 around the first rotation axis Ax1. That is, the spindle motor 13 is coupled to the plurality of magnetic disks 12. The position of the magnetic disk 12 is more likely to differ from its design position as the magnetic disk 12 is farther in the Z direction from the bottom wall 21 of the housing 11, to which the spindle motor 13 is attached. Further, the suspension 37 is urged by the magnetic head 14 attached to the recording surface 12a of the magnetic disk 12 that is stabilized due to the air pressure. That is, in the Z direction, the position of the lift tab 45 of the suspension 37 is affected by the position of the magnetic disk 12. From the above, in the lift tabs 45 of the plurality of suspensions 37, the farther the lift tab 45 is from the bottom wall 21 in the Z direction, the greater the variation in the position of the lift tab 45 in the Z direction, and further the greater the variation in the position of the lift tab 45 where the lift tab 45 abuts the inclined surface 56 in the circumferential direction around the second rotation axis Ax1. In the HDD 10 according to the present embodiment, the plurality of inclined surfaces 56 include the inclined surfaces 56A, 56B, and 56C which support three lift tabs 45 of three of suspensions 37, respectively. The inclined surface 56B is farther from the bottom wall 21 in the Z direction than is the inclined surface 56A and closer to the bottom wall 21 in the Z direction than is the inclined surface 56C. In the plurality of inclined surfaces 56, the end 61 of the indicated surface 56B in the inward direction Di is closer to the first rotation axis Ax1 than is the end 61 of the inclined surface 56A in the inward direction Di and is farther from the first rotation axis Ax1 than is the end 61 of the inclined surface 56C in the inward direction Di. In this case, one of the lift tabs 45 is more likely to abut its corresponding inclined surface 56A later than another one of the lift tabs 45 abuts its corresponding inclined surface 56C. Also, one of the lift tabs 45 is more likely to abut its corresponding inclined surface 56B later than another one of the lift tab 45 abuts its corresponding inclined surface 56C. The range RC of the position where the lift tab 45 abuts the inclined surface 56C is larger than the range RA of the position where the lift tab 45 abuts the inclined surface 56A and the range RB of the position where the lift tab 45 abuts the inclined surface 56B. In the above-described inclined surfaces 56A, 56B, and 56C, the ranges RA and RB are away from the first rotation axis Ax1 in the circumferential direction around the second rotation axis Ax2 than is the range RC. The first abutment between one of the lift tabs 45 of the plurality of suspensions 37 and its corresponding inclined surface 56 is likely to occur in an overlapped range of the ranges RA, RB, and RC. Therefore, the position (first touch position) where one of the lift tabs 45 of the plurality of suspensions 37 first abut its corresponding inclined surface 56 tends to shift away from the first rotation axis Ax1 in the circumferential direction around the second rotation axis Ax2. Further, generally, the data area 12c of the magnetic disk 12 is set based on the first touch position. From the above perspective, the HDD 10 according to the present embodiment can restrict the data area 12c of the magnetic disk 12 from narrowing by making the first touch position farther from the first rotation axis Ax1.

The angles θ between the plurality of inclined surfaces 56 and its corresponding recording surfaces 12a, respectively, are equal to each other. As a result, the lift tab 45 corresponding to the inclined surface 56B and another lift tab 45 corresponding to the inclined surface 56A are more likely to abut its corresponding inclined surfaces 56 later than does the lift tab 45 corresponding to the inclined surface 56C. Therefore, the first touch position tends to shift away from the first rotation axis Ax1 in the circumferential direction around the second rotation axis Ax2. In the HDD 10 according to the embodiment, by making the first touch position farther from the first rotation axis Ax1, it is possible to restrict the data area 12c of the magnetic disk 12 from narrowing.

In the circumferential direction around the second rotation axis Ax2, each end 61 of the inclined surface 56 is provided at the same position as the end 61 of another inclined surface 56 which is adjacent thereto and is closer to the bottom wall 21, or a position closer to the first rotation axis Ax1. That is, the end 61 of each inclined surface 56 is not farther from the first rotation axis Ax1 than the end 61 of another inclined surface 56 closer to the bottom wall 21. Therefore, the lift tab 45 of one of the plurality of suspensions 37, which is closer to the bottom wall 21, is more likely to abut the inclined surface 56 later than the other lift tabs 45. That is, the range of the position where the lift tab 45 of the suspension 37, which is closer to the bottom wall 21, abuts the inclined surface 56, shifts away from the first rotation axis Ax1 in the circumferential direction around the second rotation axis Ax2. Therefore, the first touch position tends to shift away from the first rotation axis Ax1 in the circumferential direction around the second rotation axis Ax2. In the HDD 10 according to the present embodiment, by making the first touch position farther from the first rotation axis Ax1, it is possible to restrict the data area 12c of the magnetic disk 12 from narrowing.

The end 62 of the inclined surface 56B in the outward direction Do is closer to the first rotation axis Ax1 than is the end 62 of the inclined surface 56A in the outward direction Do and is farther from the first rotation axis Ax1 than is the end 62 of the inclined surface 56C in the outward direction Do. Therefore, the lengths of the inclined surfaces 56A, 56B, and 56C in the circumferential direction around the second rotation axis Ax2 may be set to be substantially the same. Therefore, in the ramp load mechanism 17 in the present embodiment, the lengths (heights) by which the plurality of inclined surfaces 56 guide the lift tabs 45 in the Z direction can be made substantially the same, and thus the magnetic heads 14 at the unload position Pu can be stably separated from their corresponding recording surfaces 12a.

As for the plurality of inclined surfaces 56, the farther from the bottom wall 21 in the Z direction, the closer the end 61 is to the first rotation axis Ax1. As a result, the lift tab 45 of one of the plurality of suspensions 37, which is closer to the bottom wall 21, is more likely to abut the inclined surface 56 later than the other lift tabs 45. That is, the range of position where the lift tab 45 of the suspension 37, which is closer to the bottom wall 21, abuts the inclined surface 56, shifts away from the first rotation axis Ax1 in the circumferential direction around the second rotation axis Ax2. Therefore, the first touch position tends to shift away from the first rotation axis Ax1 in the circumferential direction around the second rotation axis Ax2. In the HDD 10 according to the embodiment, by making the first touch position farther from the first rotation axis Ax1, it is possible to restrict the data area 12c of the magnetic disk 12 from narrowing.

When the plurality of suspensions 37 rotate from the load position P1 to the unload position Pu, the inclined surface 56B abuts the lift tab 45 before the inclined surface 56A abuts the lift tab 45 and after the inclined surface 56C abuts the lift tab 45. That is, among the plurality of suspensions 37, the lift tab 45 closer to the bottom wall 21 comes into contact with its corresponding inclined surface 56 after do the other lift tabs 45. In the HDD 10 according to the present embodiment, by first making the lift tab 45 of specific one of the plurality of suspensions 37 abut the inclined surface 56, it is possible to restrict the size of the data area 12c of the magnetic disk 12 from becoming unstable.

The lift tabs 45 of the plurality of suspensions 37 overlap in the Z direction. In other words, the lift tabs 45 of the plurality of suspensions 37 are located at substantially the same position in the circumferential direction around the second rotation axis Ax2. As a result, in the HDD 10 according to the present embodiment, the lift tab 45 corresponding to the inclined surface 56B, and the lift tab 45 corresponding to the inclined surface 56A are more likely to abut its corresponding inclined surfaces 56 later than does the lift tab 45 corresponding to the inclined surface 56C. Further, the ranges RA and RB of the positions where the lift tabs 45 of the suspensions 37 corresponding to the inclined surfaces 56A and 56B abut the inclined surfaces 56 shift away from the first rotation axis Ax1 in the circumferential direction around the second rotation axis Ax2. Therefore, the first touch position tends to shift away from the first rotation axis Ax1 in the circumferential direction around the second rotation axis Ax2. In the HDD 10 according to the embodiment, by making the first touch position farther from the first rotation axis Ax1, it is possible to restrict the data area 12c of the magnetic disk 12 from narrowing.

Second Embodiment

Hereinafter, a second embodiment will be described with reference to FIGS. 5 and 6. In the following description of the following embodiment, the component elements having the same functions as the component elements already described may be designated by the same reference numerals and letters as those of the component elements described above, and the description thereof may be omitted. Further, the plurality of component elements with the same reference numerals and letters do not necessarily have all the functions and properties in common and may have different functions and properties according to each embodiment.

Figure 5:
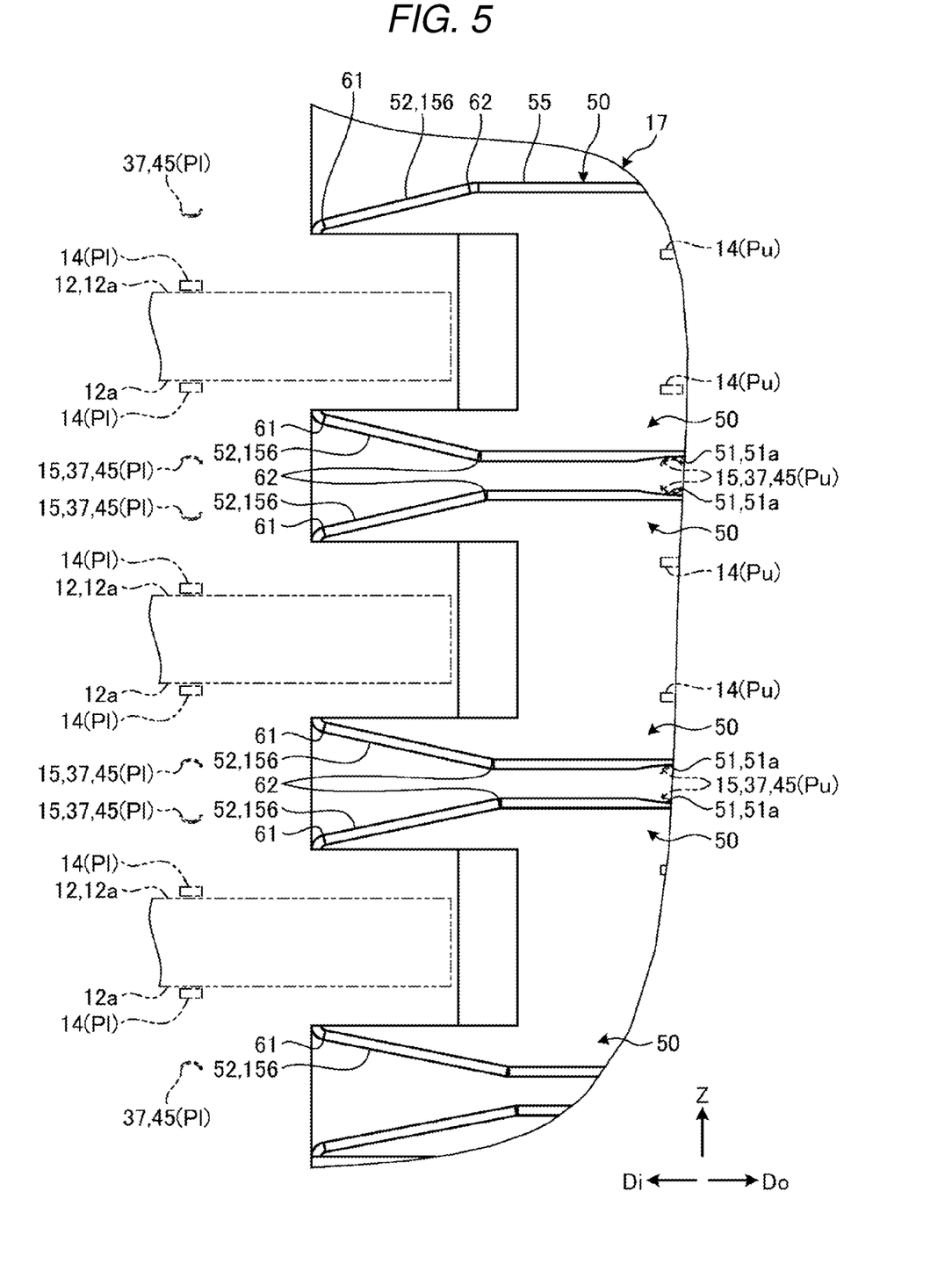
FIG. 5 illustrates a side view of a part of a ramp load mechanism in a disk device according to a second embodiment.

FIG. 5 illustrates a side view of a part of the ramp load mechanism 17 in the HDD 10 according to the second embodiment. The ramp load mechanism 17 in the second embodiment includes a plurality of inclined surfaces 156 instead of the plurality of inclined surfaces 56. The inclined surface 156 is equivalent to the inclined surface 56 in the first embodiment, except as described below.

In the second embodiment, the ends 61 of the plurality of inclined surfaces 156 in the inward direction Di are located at the same position in the circumferential direction around the second rotation axis Ax1. Even when there is a slight amount of error in positions of ends 61 of the plurality of inclined surfaces 156 due to deformation, dimensional tolerance, or other factors, the ends 61 of the plurality of inclined surfaces 156 can be treated as being located at the same position. The positions of the ends 61 of the plurality of inclined surfaces 156 may be different from each other.

The inclined surface 156 in the second embodiment that is farther from the bottom wall 21 in the Z direction have a smaller angle with respect to its corresponding recording surface 12a. Therefore, the angle between an inclined surface 156 and its corresponding recording surface 12a is the same as or smaller than an angle between the recording surface 12a and another inclined surface 156, which is adjacent to the inclined surface 156 and closer to the bottom wall 21 than is the inclined surface 156.

The angle between one of the plurality of inclined surfaces 156 and its corresponding recording surface 12a may be the same as the angle between the other adjacent one of the plurality of inclined surfaces 156 and its corresponding recording surface 12a. However, in the present embodiment, the angle between the recording surface 12a and one of the inclined surfaces 156 farthest from the bottom wall 21 is smaller than the angle between the recording surface 12a and one of the inclined surfaces 156 closest to the bottom wall 21.

Figure 6:
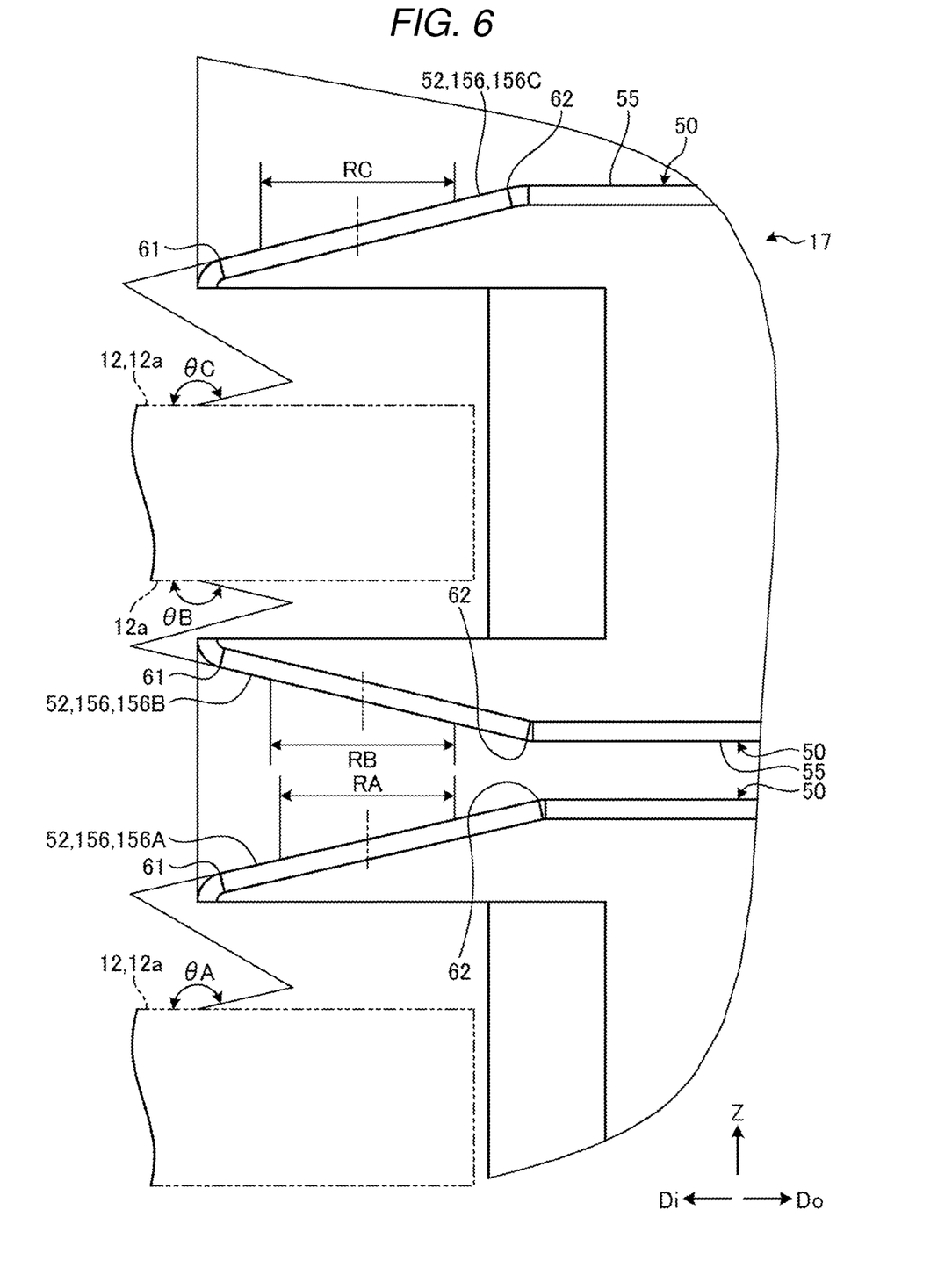
FIG. 6 illustrates a side view of three inclined surfaces of the ramp load mechanism in the disk device according to the second embodiment.

FIG. 6 illustrates a side view of inclined surfaces 156A, 156B, and 156C of the ramp load mechanism 17 in the second embodiment. The following description describes in detail the plurality of inclined surfaces 156 by taking FIG. 6 as an example.

As illustrated in FIG. 6, the plurality of inclined surfaces 156 include the inclined surfaces 156A, 156B, and 156C. The inclined surface 156A is an example of a first inclined surface. The inclined surface 156B is an example of a second inclined surface. The inclined surface 156C is an example of a third inclined surface. The inclined surfaces 156A, 156B, and 156C are equivalent to the inclined surfaces 56A, 56B, and 56C in the first embodiment, except for the points described below.

In the present embodiment, an angle θB between the inclined surface 156B and the recording surface 12a is smaller than an angle θA between the inclined surface 156A and the recording surface 12a and greater than an angle θC between the inclined surface 156C and the recording surface 12a. Therefore, by design, when the plurality of suspensions 37 rotate from the load position P1 to the unload position Pu, the inclined surface 156B abuts its corresponding lift tab 45 before the inclined surface 156A abuts its corresponding lift tab 45 and after the inclined surface 156C abuts its corresponding lift tab 45.

As in the first embodiment, the range RB of the position where the lift tab 45 may abut the inclined surface 156B is wider than the range RA where the lift tab 45 may abut the inclined surface 156A. Also, the range RB is narrower than the range RC of the position where the lift tab 45 may abut the inclined surface 156C.

The center of the range RA is farther from the first rotation axis Ax1 than is the center of the range RB, and the center of the range RB is farther from the first rotation axis Ax1 than is the center of the range RC. The ends of the ranges RA, RB, and RC in the outward direction Do are located at substantially the same position in the circumferential direction around the second rotation axis Ax1.

From the above, as in the first embodiment, in the ramp load mechanism 17 in the second embodiment, the first touch position tends to be farther from the first rotation axis Ax1. Therefore, the data area 12c tends to be wider.

In the plurality of inclined surfaces 156 of the HD 10 according to the second embodiment described above, instead of the ends 61 being provided at different positions as in the first embodiment, the angle θB between the inclined surface 156B and its corresponding recording surface 12a is smaller than the angle θA between the inclined surface 156A and its corresponding recording surface 12a. Further, the angle θB is larger than the angle θC between the inclined surface 156C and its corresponding recording surface 12a. In this case, the lift tab 45 corresponding to the inclined surface 156B and the lift tab 45 corresponding to the inclined surface 156A are more likely to abut the inclined surfaces 156 later than does the lift tab 45 corresponding to the inclined surface 156C. The range RC of the position where the lift tab 45 is likely to abut the inclined surface 156C is larger than the range RA of the position where the lift tab 45 is likely to abut the inclined surface 156A and the range RB of the position where the lift tab 45 is likely to abuts the inclined surface 156B. In the above-described inclined surfaces 156A, 156B, and 156C, the ranges RA and RB are apart from the first rotation axis Ax1 in the circumferential direction around the second rotation axis Ax2 than is the range RC. The first abutment between any one of the lift tabs 45 of the plurality of suspensions 37 and its corresponding inclined surface 156 is likely to occur in an overlapped range of the ranges RA, RB, and RC. Therefore, the first touch position tends to shift away from the first rotation axis Ax1 in the circumferential direction around the second rotation axis Ax2. From the above, the HDD 10 according to the present embodiment can restrict the data area 12c of the magnetic disk 12 from narrowing by making the first touch position farther from the first rotation axis Ax1.

The ends 61 of the plurality of inclined surfaces 156 in the inward direction Di are located at the same position in the circumferential direction around the second rotation axis Ax2. As a result, the lift tab 45 corresponding to the inclined surface 156B and the lift tab 45 corresponding to the inclined surface 156A are more likely to abut their corresponding inclined surfaces 156 later than does the lift tab 45 corresponding to the inclined surface 156C. Therefore, the first touch position tends to shift away from the first rotation axis Ax1 in the circumferential direction around the second rotation axis Ax2. In the HDD 10 according to the second embodiment, by making the first touch position farther from the first rotation axis Ax1, it is possible to restrict the data area 12c of the magnetic disk 12 from narrowing.

The angle between each inclined surface 156 and its corresponding recording surface 12a is the same as or smaller than the angle between the recording surface 12a and another one of the plurality of inclined surfaces 156, which is adjacent to the inclined surface 156 and closer to the bottom wall 21 than the inclined surface 156. That is, the angle between each inclined surface 156 and its corresponding recording surface 12a is not greater than the angle between the inclined surface 156 closer to the bottom wall 21 and its corresponding recording surface 12a. As a result, the closer the lift tab 45 is to the bottom wall 21, the later the lift tab 45 abuts its corresponding inclined surface 156. That is, the range of the position where the lift tab 45 of the suspension 37 closer to the bottom wall 21 abuts the inclined surface 156 shifts away from the first rotation axis Ax1 in the circumferential direction around the second rotation axis Ax2. Therefore, the first touch position tends to shift away from the first rotation axis Ax1 in the circumferential direction around the second rotation axis Ax2. In the HDD 10 according to the second embodiment, by making the first touch position farther from the first rotation axis Ax1, it is possible to restrict the data area 12c of the magnetic disk 12 from narrowing.

The farther the inclined surface 156 is from the bottom wall 21 in the Z direction, the smaller angle the inclined surface 156 has with respect to its corresponding recording surface 12a. Therefore, the closer the lift tab 45 is to the bottom wall 21, the later the lift tab 45 is likely to abut its corresponding inclined surface 156. That is, the range of the position where the lift tab 45 closer to the bottom wall 21 abuts the inclined surface 156 shifts away from the first rotation axis Ax1 in the circumferential direction around the second rotation axis Ax2. Therefore, the first touch position tends to shift away from the first rotation axis Ax1 in the circumferential direction around the second rotation axis Ax1. In the HDD 10 according to the second embodiment, by making the first touch position farther from the first rotation axis Ax1, it is possible to restrict the data area 12c of the magnetic disk 12 from narrowing.

In the above description, restriction is defined as, for example, preventing occurrence of an event, action, or effect, or reducing a degree of event, action, or effect. Further, in the above description, limitation is defined as, for example, preventing movement or rotation, or allowing movement or rotation in a predetermined range and preventing movement or rotation beyond the predetermined range.

While certain embodiments have been described, these embodiments have been presented by way of example only, and are not intended to limit the scope of the disclosure. Indeed, the novel embodiments described herein may be embodied in a variety of other forms; furthermore, various omissions, substitutions and changes in the form of the embodiments described herein may be made without departing from the spirit of the disclosure. The accompanying claims and their equivalents are intended to cover such forms or modifications as would fall within the scope and spirit of the disclosure.

What is claimed is:

1. A disk device comprising:
a plurality of magnetic disks arranged above a housing bottom and configured to be rotated around a first rotation axis;
a plurality of ramps arranged above the housing bottom;
a plurality of suspensions configured to be rotated around a second rotation axis parallel to the first rotation axis;
a plurality of magnetic heads mounted on the suspensions, respectively, and configured to perform reading and writing with respect to the magnetic disks, wherein
each of the suspensions is configured to be rotated around the second rotation axis from a first position above or below one of the magnetic disks to a second position on one of the ramps,
the plurality of ramps includes a first ramp, a second ramp above the first ramp, and a third ramp above the second ramp, and
an inner end of the second ramp is closer to the first rotation axis than is an inner end of the first ramp, and an inner end of the third ramp is closer to the first rotation axis than the inner end of the second ramp.

2. The disk device according to claim 1, wherein
the first ramp includes a first surface inclined with respect to a corresponding one of the magnetic disks by a first angle, and
the second ramp includes a second surface inclined with respect to a corresponding one of the magnetic disks by a second angle, the second angle being equal to the first angle.

3. The disk device according to claim 2, wherein
an inner end of the second surface is closer to the first rotation axis than an inner end of the first surface, and
an outer end of the second surface is closer to the first rotation axis than an outer end of the first surface.

4. The disk device according to claim 2, wherein a length of the first surface along a rotation direction of the suspensions is equal to a length of the second surface along the rotation direction.

5. The disk device according to claim 1, wherein
the plurality of magnetic heads includes a first magnetic head and a second magnetic head corresponding to the first ramp and the second ramp, respectively,
the first magnetic head is configured to perform the reading and writing on a first recording surface of one of the magnetic disks, and
the second magnetic head is configured to perform the reading and writing on a second recording surface of the one of the magnetic disks opposite to the first recording surface.

6. The disk device according to claim 1, wherein
the plurality of magnetic heads includes a first magnetic head and a second magnetic head corresponding to the first ramp and the second ramp, respectively,
the first magnetic head is configured to perform the reading and writing on a first one of the magnetic disks, and
the second magnetic head is configured to perform the reading and writing on a second one of the magnetic disks.

7. The disk device according to claim 1, wherein
the first ramp includes a first surface inclined with respect to a corresponding one of the magnetic disks by a first angle,
the second ramp includes a second surface inclined with respect to a corresponding one of the magnetic disks by a second angle, the second angle being equal to the first angle, and
the third ramp includes a third surface inclined with respect to a corresponding one of the magnetic disks by a third angle, the third angle being equal to the first angle.

8. The disk device according to claim 7, wherein
an inner end of the second surface is closer to the first rotation axis than an inner end of the first surface,
an outer end of the second surface is closer to the first rotation axis than an outer end of the first surface, an inner end of the third surface is closer to the first rotation axis than the inner end of the second surface, and an outer end of the third surface is closer to the first rotation axis than the outer end of the second surface.

9. The disk device according to claim 1, wherein
the plurality of magnetic heads includes a first magnetic head, a second magnetic head, and a third magnetic head corresponding to the first ramp, the second ramp, and the third ramp, respectively,
the first magnetic head is configured to perform the reading and writing on a first recording surface of a first one of the magnetic disks,
the second magnetic head is configured to perform the reading and writing on a second recording surface of the first one of the magnetic disks opposite to the first recording surface, and
the third magnetic head is configured to perform the reading and writing on a third recording surface of a second one of the magnetic disks.

10. The disk device according to claim 1, wherein
the plurality of magnetic heads includes a first magnetic head, a second magnetic head, and a third magnetic head corresponding to the first ramp, the second ramp, and the third ramp, respectively,
the first magnetic head is configured to perform the reading and writing on a first recording surface of a first one of the magnetic disks,
the second magnetic head is configured to perform the reading and writing on a second recording surface of a second one of the magnetic disks, and
the third magnetic head is configured to perform the reading and writing on a third recording surface of the second one of the magnetic disks opposite to the second recording surface.

11. A disk device comprising:
a plurality of magnetic disks configured to be rotated around a first rotation axis;
a first ramp, a second ramp, and a third ramp that are arranged above a housing bottom;
a first suspension, a second suspension, and a third suspension that are configured to be rotated around a second rotation axis parallel to the first rotation axis;
a first magnetic head, a second magnetic head, and a third magnetic head that are mounted on the first, second, and third suspensions, respectively, and configured to perform reading and writing with respect to first, second, and third recording surfaces of the magnetic disks, respectively, wherein
the first, second, and third suspensions are configured to be rotated about the second rotation axis from a first position adjacent to the magnetic disks, respectively, to a second position on the first, second, and third ramps, respectively,
the second ramp is above the first ramp, and the third ramp is above the second ramp, and
an inner end of the second ramp is closer to the first rotation axis than an inner end of the first ramp, and an inner end of the third ramp is closer to the first rotation axis than the inner end of the second ramp.

12. The disk device according to claim 11, wherein
the first ramp includes a first surface inclined with respect to a corresponding one of the magnetic disks by a first angle, and the second ramp includes a second surface inclined with respect to a corresponding one of the magnetic disks by a second angle, the second angle being equal to the first angle.

13. The disk device according to claim 12, wherein
an inner end of the second surface is closer to the first rotation axis than an inner end of the first surface, and
an outer end of the second surface is closer to the first rotation axis than an outer end of the first surface.

14. The disk device according to claim 13, wherein a length of the first surface along a rotation direction of the first and second suspensions is equal to a length of the second surface along the rotation direction.

15. The disk device according to claim 12, wherein a length of the first surface along a rotation direction of the first and second suspensions is different from a length of the second surface along the rotation direction.

16. The disk device according to claim 11, wherein
the first ramp includes a first surface inclined with respect to a corresponding one of the magnetic disks by a first angle, and
the second ramp includes a second surface inclined with respect to a corresponding one of the magnetic disks by a second angle, the second angle being less than the first angle.

17. The disk device according to claim 11, wherein
the first ramp includes a first surface inclined with respect to a corresponding one of the magnetic disks by a first angle,
the second ramp includes a second surface inclined with respect to a corresponding one of the magnetic disks by a second angle, the second angle being equal to the first angle, and
the third ramp includes a third surface inclined with respect to a corresponding one of the magnetic disks by a third angle, the third angle being equal to the first angle.

18. The disk device according to claim 17, wherein
an inner end of the second surface is closer to the first rotation axis than an inner end of the first surface,
an outer end of the second surface is closer to the first rotation axis than an outer end of the first surface,
an inner end of the third surface is closer to the first rotation axis than the inner end of the second surface, and
an outer end of the third surface is closer to the first rotation axis than the outer end of the second surface.

19. The disk device according to claim 11, wherein
the first magnetic head is configured to perform the reading and writing on the first recording surface of a first one of the magnetic disks,
the second magnetic head is configured to perform the reading and writing on the second recording surface of the first one of the magnetic disks opposite to the first recording surface, and
the third magnetic head is configured to perform the reading and writing on the third recording surface of a second one of the magnetic disks.

20. The disk device according to claim 11, wherein
the first magnetic head is configured to perform the reading and writing on the first recording surface of a first one of the magnetic disks,
the second magnetic head is configured to perform the reading and writing on the second recording surface of a second one of the magnetic disks, and the third magnetic head is configured to perform the reading and writing on the third recording surface of the second one of the magnetic disks opposite to the second recording surface.

* * * * *